US012617234B1

(12) United States Patent
　　Zhang et al.

(10) Patent No.: US 12,617,234 B1
(45) Date of Patent: May 5, 2026

(54) AXLE STRUCTURE AND LAWN MOWING ROBOT

(71) Applicant: Shenzhen GOKO Innovation Technology Co., Ltd., Shenzhen (CN)

(72) Inventors: Haifeng Zhang, Shenzhen (CN); Pengjian Li, Shenzhen (CN); Huayang Xu, Shenzhen (CN)

(73) Assignee: Shenzhen GOKO Innovation Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/414,530

(22) Filed: Dec. 10, 2025

(30) Foreign Application Priority Data

Aug. 8, 2025　(CN) .......................... 202521685757.9

(51) Int. Cl.
　　*B60B 35/02*　　(2006.01)
　　*B60B 35/16*　　(2006.01)
　　*A01D 34/00*　　(2006.01)
　　*A01D 101/00*　　(2006.01)
　　*B62D 7/14*　　(2006.01)

(52) U.S. Cl.
　　CPC .............. *B60B 35/02* (2013.01); *B60B 35/16* (2013.01); *A01D 34/008* (2013.01); *A01D 2101/00* (2013.01); *B62D 7/142* (2013.01)

(58) Field of Classification Search
　　CPC ....... B60B 35/02; B60B 35/16; B60B 35/166; B60B 35/06; B62D 5/26
　　See application file for complete search history.

(56) References Cited

FOREIGN PATENT DOCUMENTS

| CN | 109927685 A | * | 6/2019 | ........... B60B 35/003 |
| CN | 217509418 U | * | 9/2022 | |
| CN | 220865149 U | * | 4/2024 | |
| CN | 120681226 A | * | 9/2025 | ........... A01D 75/185 |
| WO | WO-2021043031 A1 | * | 3/2021 | ................ B25J 5/00 |

* cited by examiner

*Primary Examiner* — Kevin Hurley
(74) *Attorney, Agent, or Firm* — Westbridge IP LLC

(57) ABSTRACT

An axle structure is applied to a lawn mowing robot, which includes a device body and a wheel body. The axle structure includes a support beam, a first axle housing, a connecting beam, and a second axle housing. The support beam is provided within the first axle housing and is configured to connect to the device body. The connecting beam is provided within the second axle housing and is rotatably connected to the support beam about a vertical direction. A lower end of the connecting beam is configured to connect to the wheel body.

18 Claims, 5 Drawing Sheets

1

AXLE STRUCTURE AND LAWN MOWING ROBOT

CROSS-REFERENCE TO RELATED APPLICATIONS

The present application claims priority to Chinese Patent Application No. 202521685757.9, filed on Aug. 8, 2025, the entire contents of which are incorporated herein by reference.

TECHNICAL FIELD

The present application relates to the technical field of robots, and in particular to an axle structure and a lawn mowing robot.

BACKGROUND

With the development of smart agriculture and garden automation, lawn mowing robots, as efficient, energy-saving, and intelligent horticultural equipment, have been widely used in home gardens, parks, and large-scale lawn management. In lawn mowing robots, the axle structure, as a crucial transmission and load-bearing structure connecting the device body to the wheel body, directly affects the robot's operational stability, terrain adaptability, and manufacturing cost.

In the related art, the axle structure of lawnmowers is usually made of integrally cast components or welded heavy steel plates, resulting in a large overall weight. This not only limits the mobility and endurance of the lawn mowing robot, but also leads to high manufacturing costs.

SUMMARY

The main purpose of the present application is to provide an axle structure and a lawn mowing robot, which aims to ensure the strength of the axle structure and reduce its weight, thereby reducing the cost of the lawn mowing robot.

To achieve the above objectives, the axle structure provided in the present application is applied to a lawn mowing robot, which includes a device body and a wheel body. The axle structure includes a support beam, a first axle housing, a connecting beam and a second axle housing.

The support beam is provided within the first axle housing and is configured to connect to the device body; and the connecting beam is provided within the second axle housing, and is rotatably connected to the support beam about a vertical direction, and a lower end of the connecting beam is configured to connect to the wheel body.

In an embodiment, the support beam and the connecting beam are provided with reinforcing flanges extending along an edge of the support beam or an edge of the connecting beam in a length direction.

In an embodiment, the support beam is connected to the first axle housing by screw fastening; and/or the connecting beam is connected to the second axle housing by screw fastening.

In an embodiment, the first axle housing and/or the second axle housing are provided with a plurality of reinforcing ribs.

In an embodiment, the first axle housing is configured as two half-housings connected on opposite sides of the support beam by screw fastening.

In an embodiment, the second axle housing is configured as two half-housings connected on opposite sides of the connecting beam by screw fastening.

In an embodiment, the connecting beam includes a plurality of connecting segments, and two adjacent connecting segments are connected at an angle; and a connecting segment adjacent to the support beam is vertically opposed to the support beam, a connecting segment adjacent to the wheel body is horizontally opposed to the wheel body, and a connection portion between two adjacent connecting segments is provided with a reinforcing protrusion.

In an embodiment, the axle structure further includes a steering assembly provided at the support beam, located within the first axle housing and configured to drive the connecting beam to rotate.

In an embodiment, an end of the connecting beam is provided with a steering shaft; a lower side of the first axle housing is provided with a first avoidance opening, an upper side of the second axle housing is provided with a second avoidance opening, and the first avoidance opening is opposed to the second avoidance opening; and the steering shaft passes through the second avoidance opening and the first avoidance opening and is rotatably connected to the support beam, and the steering assembly is drivingly connected to the steering shaft.

In an embodiment, the wheel body is provided with a movement driving member connected to the connecting beam, and a controller is provided within the first axle housing; and the steering shaft is provided with a wire channel extending through the steering shaft along an axis center of the steering shaft, and a wire of the controller sequentially passes through the first axle housing, the wire channel, and the second axle housing to connect to the movement driving member.

In an embodiment, the support beam is provided with connecting lugs bent and formed at opposite sides of the support beam in a width direction, and the connecting lugs are rotatably connected to the device body.

In an embodiment, the first axle housing is provided with avoidance grooves recessed at opposite sides of the first axle housing in a width direction, the support beam is rotatably connected with a swing pivot shaft, and an end of the swing pivot shaft passes through the first axle housing and is connected to the device body within the avoidance groove.

In an embodiment, the support beam and the connecting beam are formed by stamping sheet metal parts, and/or the support beam and the connecting beam are provided with weight reduction holes.

In an embodiment, the first axle housing and the second axle housing are made of plastic material.

The present application also provides a lawn mowing robot, which includes the aforementioned axle structure.

The technical solution of the present application involves setting a first axle housing outside the support beam connecting the device body, and setting a second axle housing outside the connecting beam connecting the wheel body, thus connecting the support beam and the connecting beam. The support beam and the connecting beam are made of high-strength, high-toughness materials, ensuring the load-bearing capacity of the axle structure. The first axle housing and second axle housing are made of lightweight materials, effectively reducing the weight of the axle structure. The first axle housing is connected to the support beam, and the second axle housing is connected to the connecting beam, thereby ensuring the strength of the axle structure while reducing its weight, and consequently reducing the manufacturing cost of the axle structure, which in turn reduces the cost of the lawn mowing robot. At the same time, the connecting beam connects to the wheel body, and is connected to the support beam in a way that rotates vertically, which allows the wheel body to rotate freely relative to the device body within a certain range, improves the lawn mowing robot's adaptability in complex terrain, enhances its obstacle-crossing performance, and enables the lawn mowing robot to cope more flexibly with different ground conditions.

BRIEF DESCRIPTION OF THE DRAWINGS

To more clearly illustrate the technical solutions in the embodiments of the present application or the related art, the drawings used in the description of the embodiments or the related art will be briefly introduced below. Obviously, the drawings described below are only some embodiments of the present application. For those skilled in the art, other drawings can be obtained based on the structures shown in these drawings without creative effort.

The present application will be further explained in conjunction with the embodiments and with reference to the accompanying drawings.

DETAILED DESCRIPTION OF THE EMBODIMENTS

The present application will be clearly and completely described below with reference to the accompanying drawings of the embodiments. Obviously, the described embodiments are only some embodiments of the present application, and not all embodiments. Based on the embodiments of the present application, all other embodiments obtained by those skilled in the art without creative effort are within the scope of protection of the present application.

It should be noted that if the embodiments of the present application involve directional indicators (such as up, down, left, right, front, rear, etc.), the directional indicators are only used to explain the relative positional relationship and movement of the components in a specific posture. If the specific posture changes, the directional indicators will also change accordingly.

Furthermore, if the embodiments of the present application involve descriptions such as "first" or " " second", these descriptions are for descriptive purposes only and should not be construed as indicating or implying their relative importance or implicitly specifying the number of technical features indicated. Therefore, a feature defined with "first" or " " second" may explicitly or implicitly include at least one of those features. Additionally, the use of "and/or" throughout the text includes three parallel solutions. For example, "A and/or B" includes solution A, solution B, or a solution where both A and B are satisfied simultaneously. Furthermore, the technical solutions of the various embodiments can be combined with each other, but this must be based on the ability of those skilled in the art to implement them. When the combination of technical solutions is contradictory or impossible to implement, it should be considered that such a combination of technical solutions does not exist and is not within the scope of protection claimed by the present application.

The present application provides an axle structure.

Figure 1:
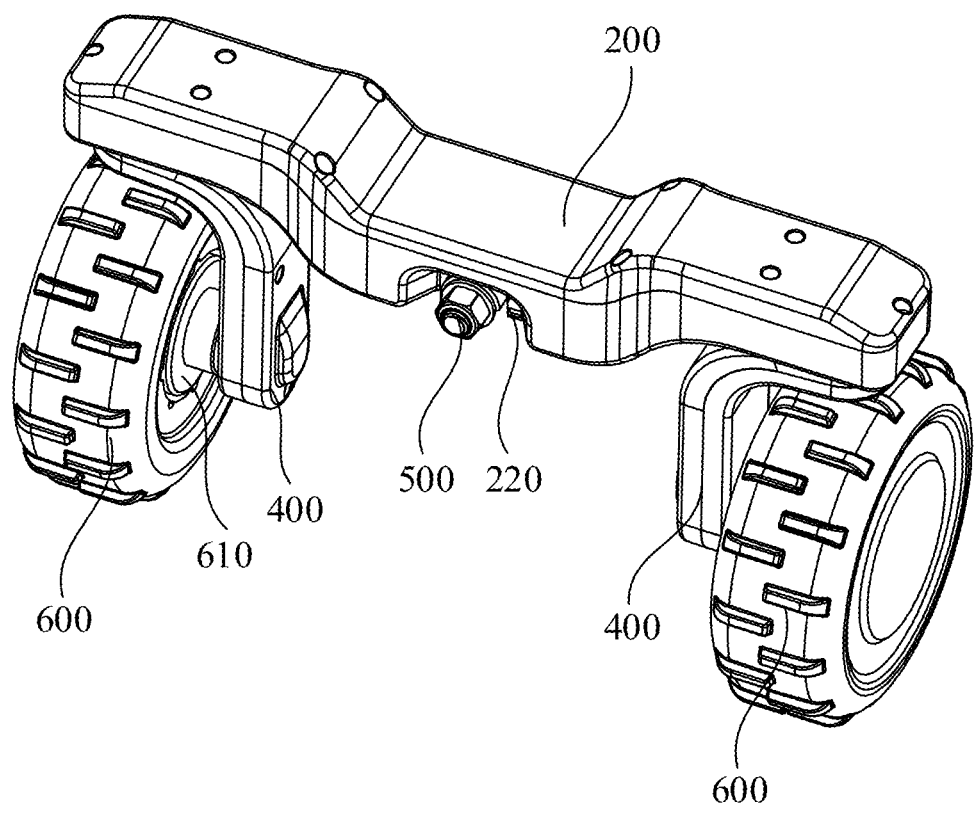
FIG. 1 is a structural schematic view of an axle structure and a wheel body connection according to an embodiment of the present application.
Figure 2:
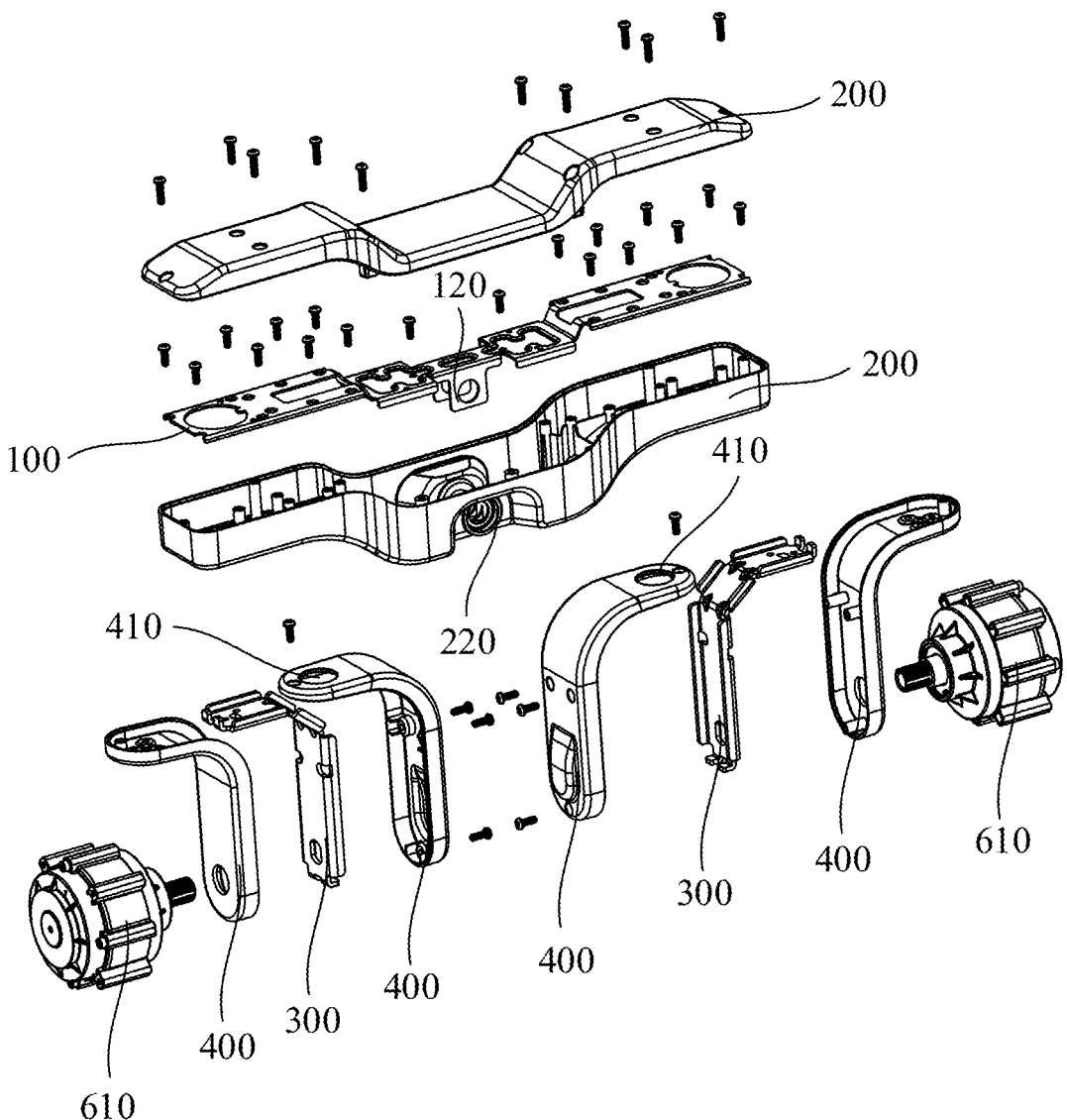
FIG. 2 is an exploded view of the axle structure in FIG. 1.
Figure 3:
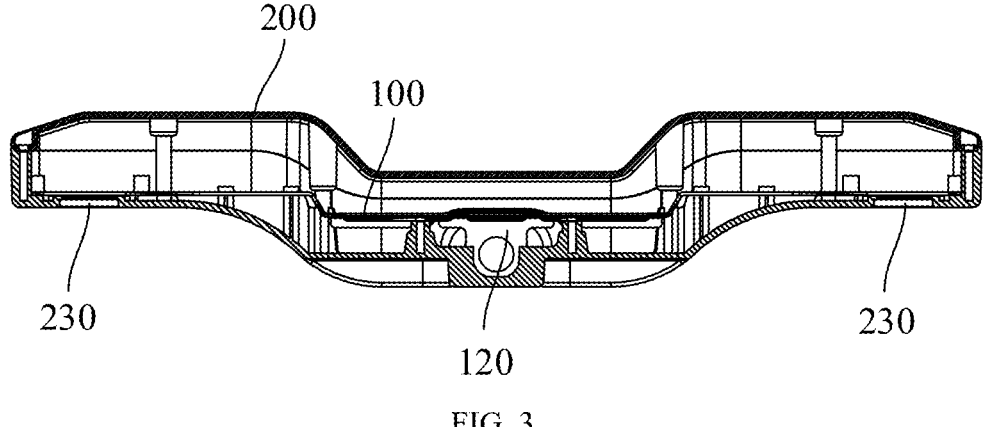
FIG. 3 is a cross-sectional view of a first axle housing and a support beam in FIG. 1.

As shown in FIG. 1 to FIG. 3, in an embodiment of the present application, the axle structure is applied to a lawn mowing robot. The lawn mowing robot includes a device body (not shown) and wheel body 600. The axle structure includes a support beam 100, a first axle housing 200, a connecting beam 300 and a second axle housing 400.

The support beam 100 is disposed within the first axle housing 200, the support beam 100 is connected to the device body.

The connecting beam 300 is disposed within the second axle housing 400. The connecting beam 300 is rotatably connected to the support beam 100 about the vertical direction. The lower end of the connecting beam 300 is used to connect the wheel body 600.

The technical solution of the present application involves providing a first axle housing 200 outside the support beam 100 connecting the device body, and a second axle housing 400 outside the connecting beam 300 connecting the wheel body 600, thereby connecting the support beam 100 and the connecting beam 300. The support beam 100 and the connecting beam 300 are made of high-strength, high-toughness materials, ensuring the load-bearing capacity of the axle structure. The first axle housing 200 and the second axle housing 400 are made of lightweight materials, effectively reducing the weight of the axle structure. The first axle housing 200 is connected to the support beam 100, and the second axle housing 400 is connected to the connecting beam 300, thus ensuring the strength of the axle structure while reducing its weight, thereby reducing the manufacturing cost of the axle structure, and consequently reducing the cost of the lawn mowing robot. Meanwhile, the connecting beam 300 is connected to the wheel body 600, and is connected to the support beam 100 in a way that rotates vertically, which allows the wheel body 600 to turn freely relative to the device body within a certain range, improving the adaptability of the lawn mowing robot in complex terrain and enhancing its obstacle-crossing performance, so that the lawn mowing robot can cope with different ground conditions more flexibly.

It should be noted that the first axle housing 200 encloses the support beam 100, and the second axle housing 400 encloses the connecting beam 300. The connecting beam 300 or the support beam 100 can be connected by components such as the steering shaft 330 passing through the first axle housing 200 and the second axle housing 400. Alternatively, a portion of the support beam 100 can extend out of the first axle housing 200, then into the second axle housing 400, and finally connect to the connecting beam 300. Another possibility is that the end of the connecting beam 300 can extend out of the second axle housing 400, then into the first axle housing 200, and finally connect to the support beam 100. Furthermore, the descriptions of "up" and "down" in this technical solution refer to the conventional state of the lawn mowing robot walking on flat ground. It is understandable that the device body is provided with a cutting disc, and the wheel body 600 can be a non-powered wheel, such as when the axle structure is configured as a front axle; or, the wheel body 600 can be a powered wheel, such as when the axle structure is configured as a rear axle. When the axle structure is configured as a front axle, the wheel body 600 can also be a powered wheel, and when the axle structure is configured as a rear axle, the wheel body 600 can also be a non-powered wheel. In the case where the wheel body 600 is a powered wheel, a movement driving member 610 is provided on the wheel body 600. The movement driving member 610 is connected to the connecting beam 300, and the movement driving member 610 drives the wheel body 600 to rotate freely. The movement driving member 610 on the wheel body 600 is electrically connected to a controller in the device body or the second axle housing 400 through a wire, so that the lawn mowing robot can control the rotation of the wheel body 600 as a powered wheel.

Figure 5:
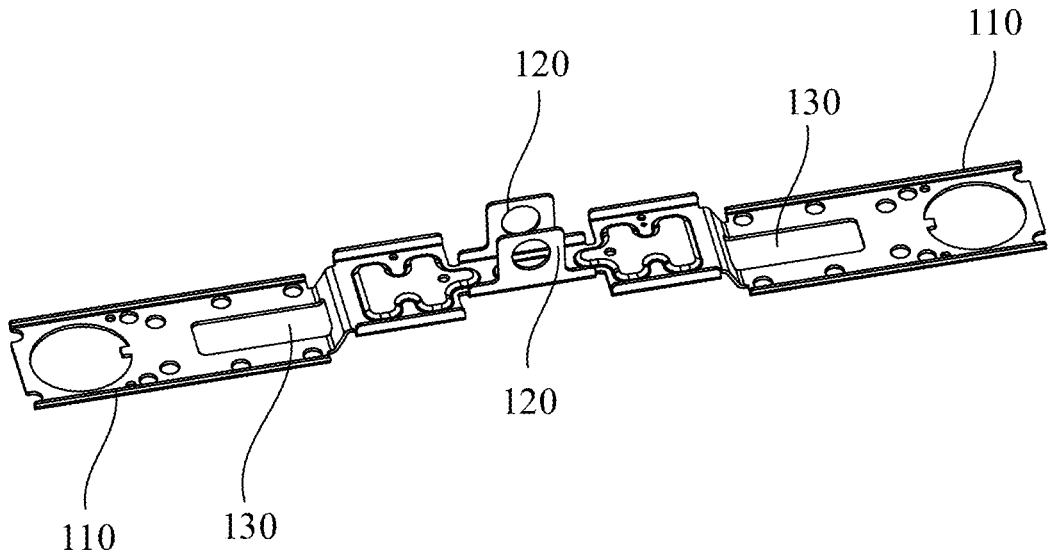
FIG. 5 is a structural schematic view of the support beam in FIG. 1.
Figure 6:
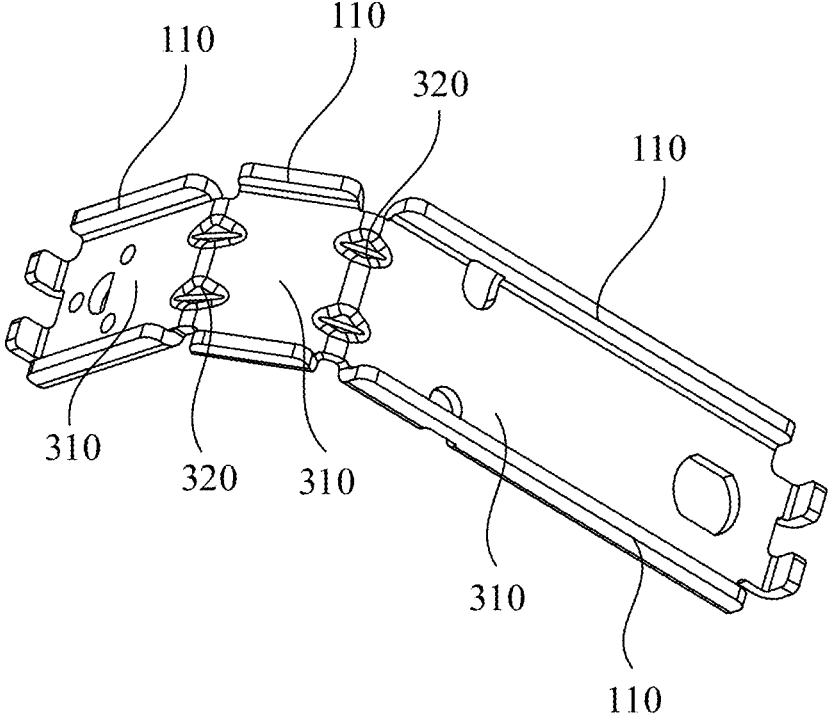
FIG. 6 is a structural schematic view of a connecting beam in FIG. 1.

In an embodiment, as shown in FIG. 2, FIG. 5, and FIG. 6, the support beam 100 and the connecting beam 300 are formed by stamping sheet metal parts. It can be understood that the support beam 100 and the connecting beam 300 are formed by sheet metal stamping using high-strength, high-toughness steel plates. This allows the support beam 100 and the connecting beam 300 to meet structural strength requirements while possessing good forming accuracy and quality, improving the consistency and assembly accuracy between various components of the axle structure. Furthermore, the stamping process has advantages such as high material utilization, high processing efficiency, and suitability for mass production, which helps reduce the manufacturing cost of the entire axle structure. In this embodiment, the support beam 100 and the connecting beam 300 are provided with weight reduction holes 130. The weight reduction holes 130 can be formed simultaneously during stamping, and the position and shape of the weight reduction holes 130 are optimized based on stress analysis to ensure that while removing excess material to reduce overall weight, the load-bearing capacity and structural rigidity of key components are not affected. In addition, the weight-reducing hole 130 can also avoid components connected to the support beam 100 or connecting beam 300, such as the drive motor and steering assembly that drive the connecting beam 300 to rotate, thereby improving the space utilization rate within the first axle housing 200 and reducing the volume of the axle structure. In other embodiments, the support beam 100 and connecting beam 300 can also be formed by casting.

Figure 4:
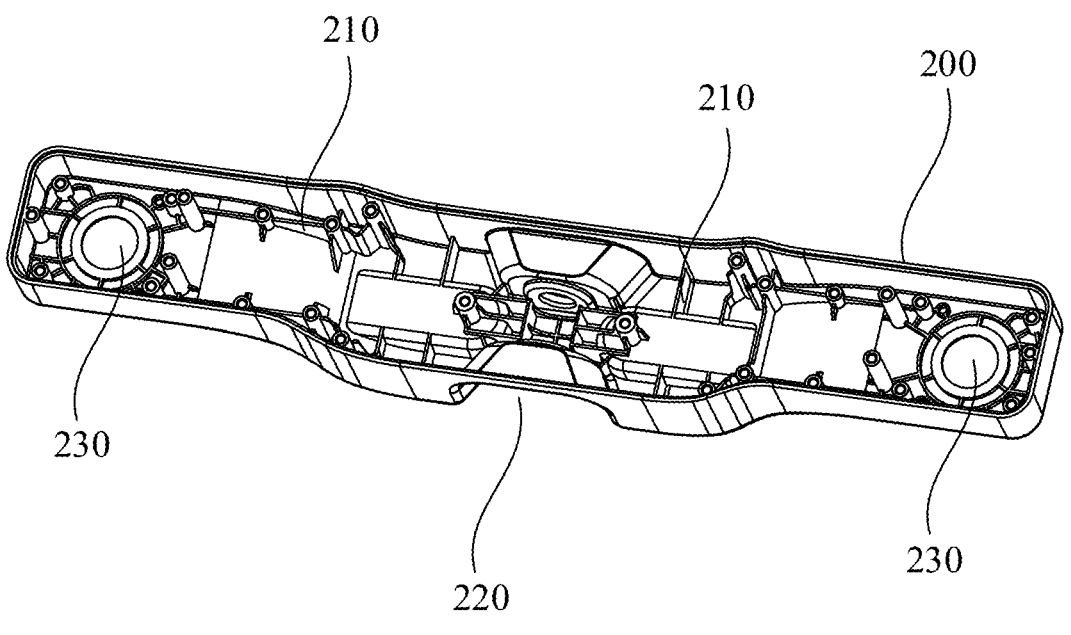
FIG. 4 is a structural schematic view of a half-housing of the first axle housing in FIG. 1.

The first axle housing 200 is used to accommodate and support the support beam 100, the second axle housing 400 is used to accommodate and support the connecting beam 300, and both housings serve as components for mounting and protecting these beams. To further achieve a lightweight design for the axle structure, in an embodiment, as shown in FIG. 2 to FIG. 4, the first axle housing 200 and the second axle housing 400 are made of plastic. Specifically, the first axle housing 200 and the second axle housing 400 can be made of high-strength, lightweight plastics, such as polyamide (PA), polycarbonate (PC), or glass fiber reinforced composite materials, which possess good mechanical strength, wear resistance, and corrosion resistance, meeting the usage requirements of the lawn mowing robot in complex outdoor environments. Thus, by configuring the first axle housing 200 and the second axle housing 400 as plastic materials, not only is the overall weight of the axle structure effectively reduced, improving the lawn mowing robot's endurance, but the amount of metal materials used is also reduced, which helps to lower the overall manufacturing cost. In other embodiments, the first axle housing 200 and the second axle housing 400 can also be made of lightweight, low-cost alloy materials.

In an embodiment, as shown in FIG. 5 and FIG. 6, to further improve the bending and torsional resistance of the axle structure while ensuring its lightweight design, the support beam 100 and connecting beam 300 are provided with reinforcing flanges 110, which extend along the edge of the support beam 100 or connecting beam 300 in the length direction. It should be noted that the reinforcing flanges 110 are alternately formed at the edge of the support beam 100 or connecting beam 300 by stamping or bending processes, and are continuously or intermittently distributed along their length direction. This increases the moment of inertia of the cross-section of the support beam 100 or connecting beam 300, thereby enhancing its bending stiffness and overall structural stability, effectively preventing deformation or fracture caused by localized stress concentration. At the same time, the reinforcing flanges 110 not only improve the structural strength of the support beam 100 and connecting beam 300, but also enhance the stability of their fit with the first axle housing 200 or the second axle housing 400. For example, during assembly, the reinforcing flanges 110 can serve as a positioning guide structure, helping to improve the assembly accuracy of the first axle housing 200 and the second axle housing 400. In addition, the reinforced flange 110 is provided at the edge of the support beam 100 or the connecting beam 300, keeping the beam body flat, which is beneficial to the installation stability of the aforementioned steering drive motor and steering assembly. In other embodiments, ribs can also be provided on the support beam 100 or the connecting beam 300 to enhance its structural strength.

Regarding the connection methods between the support beam 100 and the first axle housing 200, the connecting beam 300 and the second axle housing 400, in an embodiment, as shown in FIG. 2 to FIG. 5, the support beam 100 is connected to the first axle housing 200 by screw fastening, and/or the connecting beam 300 is connected to the second axle housing 400 by screw fastening. It is understood that positioning holes or counterbore holes are opened at corresponding positions on the support beam 100 and the first axle housing 200, and screws are used for fastening, so that the support beam 100 is stable inside the first axle housing 200, ensuring that the axle structure is not prone to displacement or loosening during operation, thereby ensuring the structural stability of the lawn mowing robot. Similarly, a similar screw fastening structure is used between the connecting beam 300 and the second axle housing 400 to ensure the stability of the connecting beam 300 within the second axle housing 400. The screw fastening connection method also has good adaptability, and the fastening torque can be adjusted according to different strength requirements to meet the usage requirements under different working conditions. Without loss of generality, the first axle housing 200 or the second axle housing 400 has a protruding threaded post inside, and the outer periphery of the threaded post is surrounded by ribs. The threaded post abuts against the support beam 100 or the connecting beam 300, and the threaded hole at the axis is used for screw fastening connection. In other embodiments, the support beam 100 and the first axle housing 200, the connecting beam 300 and the second axle housing 400 can also be connected by riveting or snap-fitting.

Regarding the structural strength of the first axle housing 200 and the second axle housing 400, in an embodiment, as shown in FIG. 2 to FIG. 4, multiple reinforcing ribs 210 are provided inside the first axle housing 200 and/or the second axle housing 400. It is understood that the reinforcing ribs 210 are distributed along the inner wall of the first axle housing 200 or the second axle housing 400, and can be arranged in a crisscross or grid pattern to enhance the overall rigidity and load-bearing capacity of the axle housing, and also to ensure the external neatness of the first axle housing 200 and the second axle housing 400. The reinforcing ribs 210 can be integrally formed inside the first axle housing 200 or the second axle housing 400 by injection molding. Thus, by providing multiple reinforcing ribs 210, the deformation resistance of the first axle housing 200 and the second axle housing 400 under external impact, bending moment, or torsional load is effectively improved, thereby ensuring the stability of the support beam 100 and the connecting beam 300 during operation. In other embodiments, multiple ribs can also be provided on the outside of the first axle housing 200.

In an embodiment, as shown in FIG. 2 to FIG. 4, the first axle housing 200 is configured as two half-housings connected and formed by screw fastening on opposite sides of the support beam 100. The second axle housing 400 is configured as two half-housings connected and formed by screw fastening on opposite sides of the connecting beam 300. It can be understood that the first axle housing 200 and/or the second axle housing 400 are formed by connecting two symmetrical or asymmetrical half-housings, with each half-housing aligned and fitted by multiple positioning holes and counterbore holes located at the periphery or ends, and fastened using standard screws. This reduces the molding difficulty of the first axle housing 200 and the second axle housing 400, helps reduce mold complexity, improves demolding efficiency, and thus reduces manufacturing costs. At the same time, the detachable connection method using screw fastening allows those skilled in the art to replace or upgrade components without damaging the overall structure, extending the product's service life and enhancing the economic efficiency of product maintenance. Furthermore, considering the above-mentioned connection of the support beam 100 to the first axle housing 200 by means of screw fastening, and the connecting beam 300 to the second axle housing 400 by means of screw fastening, it can be seen that some screw connection positions can be connected to the support beam 100 or the connecting beam 300 at the same time as the first axle housing 200 or the second axle housing 400 is formed, thereby simplifying the assembly of the axle structure.

The two half-housings are located on opposite sides of the support beam 100 or the connecting beam 300, respectively, increasing the cross-sectional width of the support beam 100 or the connecting beam 300. For example, the connection between the first axle housing 200 and the support beam 100 improves the structural strength of the bridge formed by the support beam 100 and the first axle housing 200, so that the force exerted by the wheel body 600 at both ends of the support beam 100 on the support beam 100 can be partially distributed to the first axle housing 200. Correspondingly, the second axle housing 400 is configured with two half-housings connected on opposite sides of the connecting beam 300 in the same way as the connection between the first axle housing 200 and the support beam 100, and will not be described again here.

Regarding the structural form of the connecting beam 300, in an embodiment, as shown in FIG. 2 and FIG. 6, the connecting beam 300 includes a plurality of connecting segments 310. Two adjacent connecting segments 310 are connected at an angle. The connecting segment 310 adjacent to the support beam 100 is vertically opposite to the support beam 100. The connecting segment 310 adjacent to the wheel body 600 is horizontally opposite to the wheel body 600. A reinforcing protrusion 320 is provided at the connection between two adjacent connecting segments 310. It is understood that the vertical extension length of the connecting beam 300 is greater than the radius of the wheel body 600, thereby avoiding interference between the support beam 100 and the first axle housing 200 and the rotation of the wheel body 600. At the same time, by bending and reversing the direction of the connecting segment 310, the connection point between the support beam 100 and the connecting beam 300 is located above the wheel body 600, which can shorten the distance between the two wheel bodies 600 on the same axle structure, meeting the miniaturization design requirements of the lawn mowing robot and reducing the probability that the supporting effect of the wheel body 600 on the axle structure will interfere with the connection stability of the support beam 100 and the connecting beam 300. Furthermore, the reinforcing protrusion 320 can be integrally formed on the outer or inner side of the connection part of the connecting segment 310, featuring local thickening or outward bulging. This effectively improves the bending and torsional strength of the connecting beam 300 at the turning point without significantly increasing its weight, preventing structural fatigue or fracture caused by stress concentration. In other embodiments, the connecting beam 300 can also be configured as a vertically extending strip beam.

In an embodiment, referring to FIG. 1 to FIG. 3, the axle structure further includes a steering assembly (not shown). The steering assembly is provided at the support beam 100 and located within the first axle housing 200. The steering assembly is used to drive the connecting beam 300 to rotate. It can be understood that the output end of the steering assembly is connected to the connecting beam 300 and is used to drive the connecting beam 300 to rotate around a vertical axis, thereby causing the wheel body 600 to adjust its direction. The steering assembly includes, but is not limited to, a steering drive motor and transmission components (such as gear sets or linkage mechanisms). The steering drive motor is fixedly mounted on the support beam 100, and its power output end transmits driving force to the connecting beam 300 through the transmission components, causing the connecting beam 300 to rotate relative to the support beam 100. Since the steering assembly is integrated inside the first axle housing 200, the spatial layout of the axle structure is effectively utilized to avoid dust contamination and mechanical damage risks caused by external exposure, improving the protective performance and operational reliability of the axle structure, and also helping to reduce the space occupied by the axle structure. In other embodiments, the steering assembly can also be installed outside the first axle housing 200.

Figure 7:
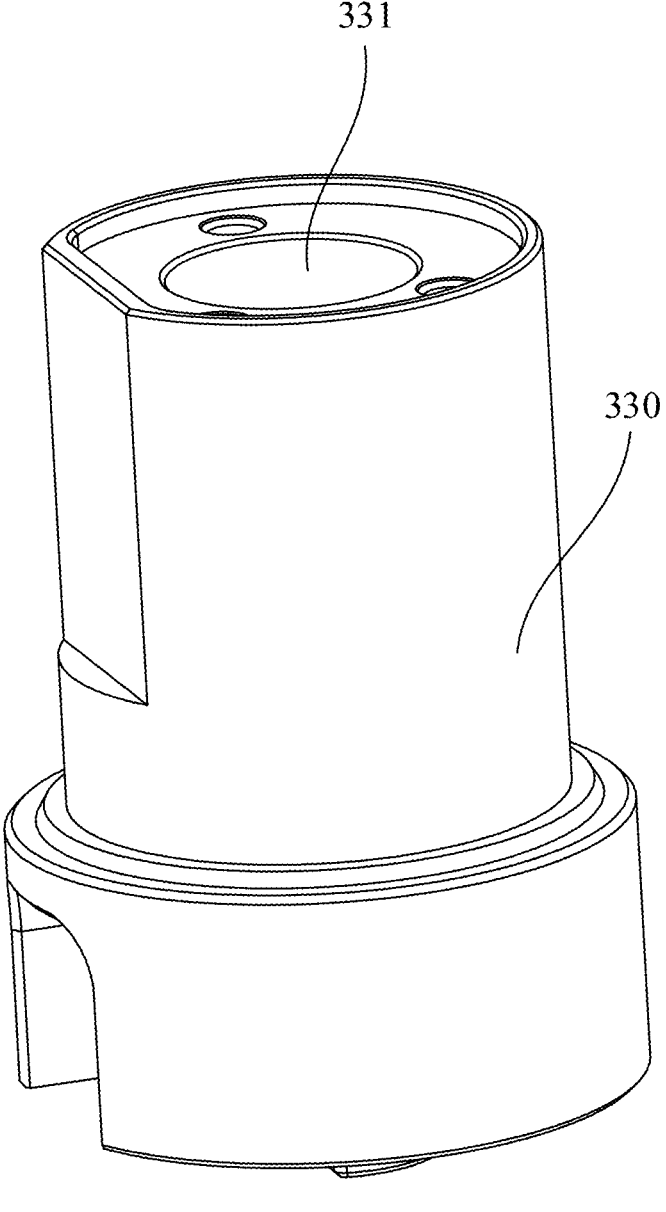
FIG. 7 is a structural schematic view of a steering shaft in FIG. 1.

Further, in this embodiment, as shown in FIG. 2, FIG. 3 and FIG. 7, a steering shaft 330 is provided at the end of the connecting beam 300, a first avoidance opening 230 is provided on the lower side of the first axle housing 200, and a second avoidance opening 410 is provided on the upper side of the second axle housing 400. The first avoidance opening 230 and the second avoidance opening 410 are arranged opposite to each other. The steering shaft 330 passes through the second avoidance opening 410 and the first avoidance opening 230 and is rotatably connected to the support beam 100. The steering assembly is drivingly connected to the steering shaft 330. It can be understood that the steering shaft 330 serves as the rotational axis between the connecting beam 300 and the support beam 100, configured to achieve the rotatable connection between the connecting beam 300 and the support beam 100. The first avoidance opening 230 and the second avoidance opening 410 are positioned opposite each other, forming a channel through which the steering shaft 330 passes. After passing through the second avoidance opening 410 and the first avoidance opening 230 in sequence, the steering shaft 330 engages with a bearing or bushing mounted on the support beam 100, thereby achieving a rotatable connection between the connecting beam 300 and the support beam 100. This not only allows the connecting beam 300 to rotate freely around its vertical axis but also effectively prevents the first axle housing 200 and the second axle housing 400 from participating in the relative rotation of the connecting beam 300 and the support beam 100. This shortens the vertical distance between the support beam 100 and the connecting beam 300 while avoiding interference with the rotation of the connecting beam 300 relative to the support beam 100, thus ensuring the flexibility of the rotation of the wheel body 600. In other embodiments, the support beam 100 and the connecting beam 300 can also be rotatably connected through the first axle housing 200 and the second axle housing 400.

In an embodiment, as shown in FIG. 1 to FIG. 3, the wheel body 600 is provided with a movement driving member 610, which is connected to the connecting beam 300. A controller is provided inside the first axle housing 200. A wire channel 331 runs through the steering shaft 330 along its axis. The controller's wires pass through the first axle housing 200, the wire channel 331, and the second axle housing 400 in sequence, and are connected to the movement driving member 610. It can be understood that the movement driving member 610 is configured as a drive unit of a motor or an integrated reduction mechanism, fixedly mounted on the connecting beam 300, and used to provide a power source for the movement of the lawn mowing robot. In order to achieve reliable power supply and signal control for the movement driving member 610, and to avoid problems such as wire entanglement and breakage due to the rotation of the connecting beam 300 relative to the support beam 100, the steering shaft 330 has a wire channel 331 along its axial direction. The wire channel 331 passes through the central axis of the steering shaft 330, forming a passage extending from the first axle housing 200 to the second axle housing 400. It is understood that the controller's wires, after being led out from the control terminal inside the first axle housing 200, sequentially pass through the wiring holes on the first axle housing 200, the wire channel 331 of the steering shaft 330, and the mating holes on the second axle housing 400, and finally connect to the movement driving member 610 mounted on the connecting beam 300. Thus, even if the connecting beam 300 rotates relative to the support beam 100, the wires maintain a stable wiring path, avoiding problems such as pulling, wear, or rotational limitations present in external wiring methods, thereby improving the reliability of the electrical connection and the operational stability of the axle structure. Furthermore, the wires being located within the first axle housing 200, the wire channel 331, and the second axle housing 400 also prevents them from being affected by the external environment, ensuring the controller's stability in controlling the movement driving member 610. In other embodiments, electrical connection terminals can also be provided between the support beam 100 and the connecting beam 300, and wires can be connected between the corresponding electrical connection terminals on the support beam 100 and the connecting beam 300, so that the controller on the support beam 100 can control the operation of the movement driving member 610 on the connecting beam 300.

Regarding the connection structure between the support beam 100 and the device body, in an embodiment, as shown in FIG. 3 and FIG. 5, the support beam 100 is provided with connecting lug 120 bent and formed at opposite sides in the width direction. The connecting lug 120 are used for rotatable connection to the device body. It can be understood that the connecting lugs 120 are integrally formed on both ends of the support beam 100 through stamping or bending processes, possessing good structural rigidity and load-bearing capacity, thus achieving a reliable rotatable connection between the support beam 100 and the device body. At the same time, each connecting lug 120 is provided with a through hole or bearing mounting position for engaging with the swing pivot shaft 500 on the device body, thereby achieving a rotatable connection of the support beam 100 relative to the device body. This allows the axle structure to swing relative to the device body within a certain angle range, helping to improve the ground-hugging performance and passability of the lawn mowing robot in complex terrain. Without loss of generality, the opposite sides of the two connecting lugs 120 abut against the opposite sides of the interior of the first axle housing 200. The first axle housing 200 or the connecting lug 120 are clamped onto the mounting base of the device body in the axial direction of the swing pivot shaft, and bearings are provided in the clamping gap, thereby limiting the swaying of the axle structure in the front-to-back direction of the lawn mowing robot and ensuring the controllability of the wheel body 600 steering of the lawn mowing robot.

In an embodiment, as shown in FIG. 1 and FIG. 4, the first axle housing 200 has avoidance grooves 220 recessed on opposite sides in the width direction. A swing pivot shaft 500 is rotatably connected to the support beam 100. The end of the swing pivot shaft 500 passes through the first axle housing 200 and connects to the device body at the avoidance grooves 220. It can be understood that the avoidance grooves 220 are formed on the sidewall of the first axle housing 200, and their shape matches the movement trajectory of the end of the swing pivot shaft 500. This ensures that the swing pivot shaft 500 has sufficient space to move when it drives the axle assembly to swing relative to the device body, avoiding structural interference. At the same time, it reduces the degree to which the swing pivot shaft 500 protrudes outside the first axle housing 200, reducing the possibility of the swing pivot shaft 500 being entangled with impurities from the external environment, such as weeds. It also similarly avoids interference with the swing of the first axle housing 200 and the support beam 100 relative to the device body, thereby helping the wheel body 600 to always remain in contact with the ground and improving the stability of the lawn mowing robot on slopes, uneven surfaces, or soft ground. The bearing is sandwiched between the bottom of the avoidance groove 220 and the mounting base of the device body, which restricts the swaying of the axle structure in the front-to-rear direction of the lawn mowing robot and ensures the controllability of the wheel body 600 steering of the lawn mowing robot. In other embodiments, both sides of the first axle housing 200 can also be formed as flat surfaces along its horizontal width, so that the swing pivot shaft 500 directly protrudes and is exposed outside the first axle housing 200.

The present application further provides a lawn mowing robot, which includes an axle structure. The specific structure of the axle structure is as described in the above embodiments. Since this lawn mowing robot adopts all the technical solutions of all the above embodiments, it has at least all the beneficial effects brought about by the technical solutions of the above embodiments, which will not be described in detail here.

The above description is merely some embodiments of the present application and does not limit the scope of protection of the present application. Any equivalent structural transformations made based on the technical concept of the present application and the contents of the present application specification and drawings, or direct/indirect applications in other related technical fields, are included within the scope of protection of the present application.

What is claimed is:

1. An axle structure, applied to a lawn mowing robot comprising a device body and a wheel body, the axle structure comprising:
   a support beam;
   a first axle housing;
   a connecting beam; and
   a second axle housing,
   wherein the support beam is provided within the first axle housing and is configured to connect to the device body; and the connecting beam is provided within the second axle housing, and is rotatably connected to the support beam about a vertical direction, and a lower end of the connecting beam is configured to be connected to the wheel body.

2. The axle structure according to claim 1, wherein the support beam and the connecting beam are provided with reinforcing flanges extending along an edge of the support beam or an edge of the connecting beam in a length direction.

3. The axle structure according to claim 1, wherein the first axle housing is provided with a plurality of reinforcing ribs.

4. The axle structure according to claim 1, wherein the connecting beam comprises a plurality of connecting segments, and two adjacent connecting segments are connected at an angle; a connecting segment adjacent to the support beam is vertically opposed to the support beam, a connecting segment adjacent to the wheel body is horizontally opposed to the wheel body, and a connection portion between two adjacent connecting segments is provided with a reinforcing protrusion.

5. The axle structure according to claim 1, further comprising:
   a steering assembly provided at the support beam, located within the first axle housing and configured to drive the connecting beam to rotate.

6. The axle structure according to claim 5, wherein:
   an end of the connecting beam is provided with a steering shaft;
   a lower side of the first axle housing is provided with a first avoidance opening, an upper side of the second axle housing is provided with a second avoidance opening, and the first avoidance opening is opposed to the second avoidance opening; and the steering shaft passes through the second avoidance opening and the first avoidance opening and is rotatably connected to the support beam, and the steering assembly is drivingly connected to the steering shaft.

7. The axle structure according to claim 6, wherein the wheel body is provided with a movement driving member connected to the connecting beam, and a controller is provided within the first axle housing; and the steering shaft is provided with a wire channel extending through the steering shaft along an axis center of the steering shaft, and a wire of the controller sequentially passes through the first axle housing, the wire channel, and the second axle housing to connect to the movement driving member.

8. The axle structure according to claim 1, wherein the support beam is provided with connecting lugs bent and formed at opposite sides of the support beam in a width direction, and the connecting lugs are rotatably connected to the device body.

9. The axle structure according to claim 1, wherein the support beam and the connecting beam are formed by stamping sheet metal parts.

10. The axle structure according to claim 1, wherein the support beam is connected to the first axle housing by screw fastening.

11. The axle structure according to claim 1, wherein the connecting beam is connected to the second axle housing by screw fastening.

12. The axle structure according to claim 1, wherein the second axle housing is provided with a plurality of reinforcing ribs.

13. The axle structure according to claim 1, wherein the first axle housing is configured as two half-housings connected on opposite sides of the support beam by screw fastening.

14. The axle structure according to claim 1, wherein the second axle housing is configured as two half-housings connected on opposite sides of the connecting beam by screw fastening.

15. The axle structure according to claim 1, wherein the first axle housing is provided with avoidance grooves recessed at opposite sides of the first axle housing in a width direction, the support beam is rotatably connected with a swing pivot shaft, and an end of the swing pivot shaft passes through the first axle housing and is connected to the device body within the avoidance groove.

16. The axle structure according to claim 1, wherein the support beam and the connecting beam are provided with weight reduction holes.

17. The axle structure according to claim 1, wherein the first axle housing and the second axle housing are made of plastic material.

18. A lawn mowing robot, comprising the axle structure according to claim 1.

* * * * *